(No Model.)
D. C. LOCKWOOD.
PROCESS OF FORMING HOLLOW RINGS OF CELLULOID, &c.
No. 251,258. Patented Dec. 20, 1881.
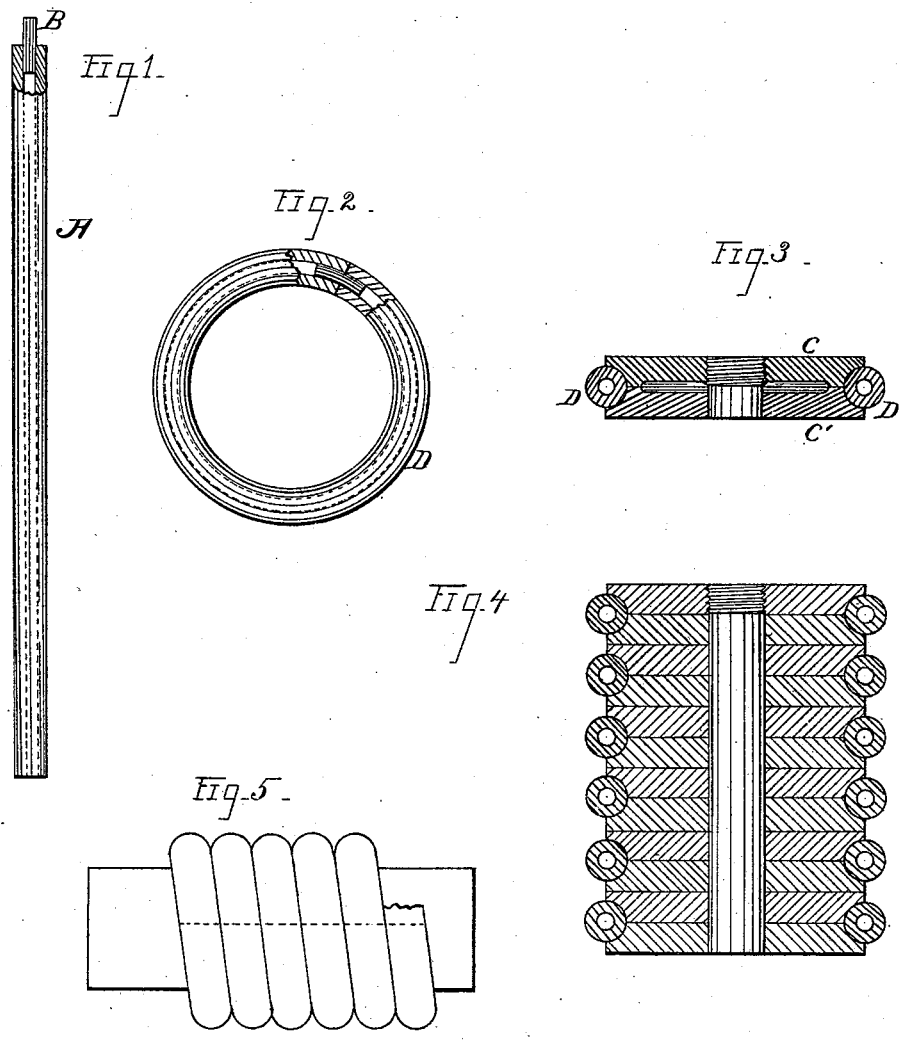
Witnesses:
Chas. E. Gill
Herman Gustow
Inventor:
David C. Lockwood,
By his Atty.
Rowland Cox.

UNITED STATES PATENT OFFICE.

DAVID C. LOCKWOOD, OF NEWARK, NEW JERSEY, ASSIGNOR TO THE RUBBER AND CELLULOID HARNESS TRIMMING COMPANY, OF SAME PLACE.

PROCESS OF FORMING HOLLOW RINGS OF CELLULOID, &c.

SPECIFICATION forming part of Letters Patent No. 251,258, dated December 20, 1881.

Application filed September 2, 1881. (No model.)

*To all whom it may concern:*

Be it known that I, DAVID C. LOCKWOOD, of Newark, in the county of Essex and State of New Jersey, have invented a new and useful Improvement in Processes of Forming Hollow Rings of Celluloid, &c., of which the following is a specification, reference being had to the accompanying drawings.

The invention has relation to a process of constructing hollow rings and articles of analogous configuration from plastic material. I contemplate its employment especially in the production of what are known as "martingale-rings," and I recommend the use of appropriate compounds of pyroxyline, especially the article known as "celluloid."

The distinctive novelty of the process consists in producing a tube of appropriate character, which is cut into pieces or sections which correspond in length with the circumference of the ring which it is desired to form. A dowel pin or peg, by preference of the same material as that out of which the ring is formed, is inserted in one end of the section of tubing, after which the section is manipulated to form a ring, the dowel-peg being utilized to secure the ends together, after which the whole is subjected to the action of a die or mold of appropriate character. The tendency of the ring to warp is corrected by a further step in the process, in which mechanical agencies hereinafter described are employed, by means of which the warping is effectually prevented.

In the accompanying drawings, Figure 1 is a view showing the section or piece of tubing with the dowel-pin inserted. Fig. 2 is a view, partly in section, showing the piece after it has been manipulated to form a ring, before it is introduced into the die or mold. Figs. 3 and 4 are views showing the construction of the mechanical appliances employed to prevent the warping of the rings after they have been removed from the die or mold. Fig. 5 is a view showing the application of the tubing to an arbor for the purpose of facilitating its division into sections.

In practicing my invention I first prepare a tubing of any desired size and shape, according to the character of the article which it is intended to produce. The tubing is cut into sections or pieces of such a length that when their ends are united they will form a ring of the desired size. After the section A has been formed the dowel-pin B, which will preferably be of the same material as the main part of the ring, is introduced in one end, being of a size and shape to fit into the tubing, and being of sufficient length to insure the objects for which it is used. The dowel-pin having been inserted, the ends of the section of the tube are brought together, the projecting end of the dowel-pin being introduced into the other end of the tubing and secured in that position sufficiently to prevent its escape until the ring is introduced into the die or mold. The ring, being in this condition, is introduced into a heated die or mold of appropriate character and pressure applied until the article is completed, when it will be found that the union of the two ends by means of the dowel-pin will be fully accomplished, the ring produced being perfectly even.

The process hereinbefore described will be carried on while the material out of which the ring is formed is in a relatively plastic state, in which condition it is important that the material should be when introduced into the mold; but a less satisfactory result may be effected when the plasticity of the material is not observable, or when the particles are in a relatively rigid condition. When the ring is taken from the mold it will have a decided tendency to warp or twist out of shape, to obviate which I provide the mechanical appliances shown in Figs. 3 and 4, of which the two pieces C C' constitute the essential parts, and which form, when connected, a groove the size of the ring D, as shown in the drawings. Two pieces may be employed, provided with appropriate means for uniting them, or a number of pieces may be connected together, as shown in Fig. 4, and provided with a means whereby the whole may be brought together after the ring has been introduced into place. In the present instance I have shown the employment of a screw, the operation of which will be readily understood by reference to the drawings; but it is quite plain that any means whereby the pieces C C' are made to hold the ring in place, or any other mechanical appliances which will hold the ring so as to prevent it from warping without injuring it, may be successfully employed. After the ring is taken from the die it is placed between the pieces C C' and permitted to remain in that position until it is thoroughly dried, when the pieces are separated and the ring or rings taken out, being in an almost finished state, and substantially ready for the market.

If preferred, in forming the sections the tube may be coiled upon an arbor of appropriate diameter and the pieces formed by cutting them in a relatively vertical plane, after which they may be manipulated as hereinbefore described.

The manner in which the sections or pieces out of which the rings are formed are made and the manner in which they are secured in position while they are being dried are matters of judgment, which may be varied according to circumstances.

What I claim as my invention, and desire to secure by Letters Patent, is—

1. The within-described process of forming hollow rings of plastic material, which consists in, first, forming a piece or section of tubing of appropriate length; second, introducing a dowel-pin and connecting the ends of the piece to form a ring; third, subjecting the ring thus formed to pressure in an appropriate mold or die.

2. The within-described process of forming rings of plastic material, which consists in, first, forming a section or piece of tubing of appropriate length; second, introducing a dowel-pin in one end of the piece and uniting the ends to form a ring; third, subjecting the ring thus formed to the action of an appropriate mold or die; fourth, permitting the rings to dry upon pieces which prevent their warping, substantially as described.

3. The within-described process of forming rings of plastic material, which consists in, first, providing a piece of tubing of appropriate length; second, introducing a dowel-pin and connecting the ends of the tubing by means thereof; third, finishing the ring by means of a die or mold; fourth, preventing the warping of the ring by means of appropriate mechanism, the whole process being carried on while the material is in a plastic state, substantially as set forth.

In testimony that I claim the foregoing improvement in processes of forming hollow rings of celluloid, &c., as above described, I have hereunto set my hand this 30th day of August, 1881.

DAVID C. LOCKWOOD.

Witnesses:
  CHAS. C. GILL,
  HERMAN GUSTOW.